US007992135B1

(12) United States Patent
Wong et al.

(10) Patent No.: US 7,992,135 B1
(45) Date of Patent: Aug. 2, 2011

(54) CERTIFICATION OF SERVER-SIDE PARTNER PLUG-INS FOR ANALYTICS AND PRIVACY PROTECTION (75) Inventors: Catherine Wong, Provo, UT (US); Brett Michael Error, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 744 days.

(21) Appl. No.: 11/875,806

(22) Filed: Oct. 19, 2007

Related U.S. Application Data (63) Continuation-in-part of application No. 11/426,556, filed on Jun. 26, 2006.

(60) Provisional application No. 60/862,516, filed on Oct. 23, 2006.

(51) Int. Cl.
*G06F 9/44* (2006.01)
*H04L 29/06* (2006.01)
*G06F 15/173* (2006.01)

(52) U.S. Cl. .................. 717/126; 713/167; 709/224

(58) Field of Classification Search .................. 717/126; 713/167
See application file for complete search history.

(56) References Cited

U.S. PATENT DOCUMENTS

| 5,935,207 A * | 8/1999 | Logue et al. ............. 709/219 |
| 5,983,348 A | 11/1999 | Ji |
| 6,182,097 B1 * | 1/2001 | Hansen et al. ........... 715/234 |
| 6,263,442 B1 * | 7/2001 | Mueller et al. ........... 726/3 |
| 6,351,816 B1 * | 2/2002 | Mueller et al. ........... 713/176 |
| 6,446,128 B1 * | 9/2002 | Woods et al. ........... 709/229 |
| 6,449,604 B1 * | 9/2002 | Hansen et al. ........... 1/1 |
| 6,473,894 B1 * | 10/2002 | Shrader et al. ........... 717/126 |
| 6,604,209 B1 * | 8/2003 | Grucci et al. ........... 714/38 |
| 6,993,747 B1 * | 1/2006 | Friedman ........... 717/124 |
| 7,085,832 B2 * | 8/2006 | Briscoe et al. ........... 709/224 |

(Continued)

FOREIGN PATENT DOCUMENTS
WO 2006017419 2/2006

OTHER PUBLICATIONS

PCT Technical Specialists E-Newsletter, http://www.ptc.com/carezone/archive/newsletters/053105_b.pdf, May 31, 2005.

(Continued)

*Primary Examiner* — Christian LaForgia
(74) *Attorney, Agent, or Firm* — Robert C. Kowert; Meyertons, Hood, Kivlin, Kowert & Goetzel, P.C.

(57) ABSTRACT

Tools and techniques are provided to allow partners of analytics providers and others who use web-beacons to submit plug-ins for scrutiny, and for the plug-in to either be refused or else to be certified for use in a core JavaScript file, data engine, or similar component. Analytics providers and others may also write plug-ins. Certified plug-ins are executed in response to page loads, visitor clicks, and other visitor and programmatic actions at a website that has been tagged by the analytics provider's web-beacon, without requiring re-tagging of the website with a separate web-beacon for the partner. This allows the partner to obtain analytics data by piggybacking on the analytics provider, without re-tagging, and without compromising the availability and accuracy of the analytics data already being gathered. To be certified, web-beacon plug-ins must satisfy specific criteria as to their privacy protection, size, behavior, namespace, and the like.

15 Claims, 4 Drawing Sheets

U.S. PATENT DOCUMENTS

| | | |
|---|---|---|
| 7,155,639 B2 * | 12/2006 | Gorshenev et al. ............ 714/38 |
| 7,165,241 B2 * | 1/2007 | Manda et al. ................. 717/124 |
| 7,222,170 B2 * | 5/2007 | Garg et al. ................... 709/224 |
| 7,376,722 B1 * | 5/2008 | Sim et al. ..................... 709/223 |
| 7,406,516 B2 * | 7/2008 | Davis et al. .................. 709/224 |
| 7,603,704 B2 * | 10/2009 | Bruening et al. .............. 726/22 |
| 7,743,425 B2 | 6/2010 | Ganesh et al. |
| RE41,440 E * | 7/2010 | Briscoe et al. ................ 709/217 |
| 7,822,871 B2 * | 10/2010 | Stolorz et al. ................. 709/238 |
| 2002/0188656 A1 * | 12/2002 | Patton et al. .................. 709/201 |
| 2004/0054817 A1 * | 3/2004 | Frey et al. ........................ 710/1 |
| 2004/0059746 A1 | 3/2004 | Error et al. |
| 2004/0059810 A1 * | 3/2004 | Chess et al. .................. 709/224 |
| 2004/0098229 A1 | 5/2004 | Error et al. |
| 2004/0103394 A1 | 5/2004 | Manda et al. |
| 2004/0122943 A1 | 6/2004 | Error et al. |
| 2004/0153967 A1 | 8/2004 | Bender et al. |
| 2004/0254942 A1 | 12/2004 | Error et al. |
| 2005/0114510 A1 | 5/2005 | Error et al. |
| 2005/0216844 A1 | 9/2005 | Error et al. |
| 2006/0123340 A1 | 6/2006 | Bailey et al. |
| 2006/0149728 A1 | 7/2006 | Error et al. |
| 2006/0277087 A1 | 12/2006 | Error |
| 2006/0277198 A1 | 12/2006 | Error et al. |
| 2006/0277211 A1 | 12/2006 | Error |
| 2006/0277212 A1 | 12/2006 | Error |
| 2006/0277585 A1 | 12/2006 | Error et al. |
| 2007/0011304 A1 | 1/2007 | Error |
| 2007/0100811 A1 | 5/2007 | Error et al. |
| 2007/0100992 A1 | 5/2007 | Wong et al. |
| 2007/0100993 A1 | 5/2007 | Malhotra et al. |
| 2007/0118392 A1 | 5/2007 | Zinn et al. |
| 2007/0168255 A1 | 7/2007 | Zinn et al. |

OTHER PUBLICATIONS

Comment Regarding Application Family, Jun. 18, 2008.
SiteCatalyst Implementation Manual, downloaded Oct. 18, 2006 from http://w2.byuh.edu/webmasters/, copyright Oct. 28, 2005.
Office Action from U.S. Appl. No. 11/426,556, mailed Sep. 30, 2010, pp. 1-21.
International Search Report for PCT/US07/61447, pp. 1-7, May 2, 2008.
International Search Report for PCT/US07/61447, pp. 1-2, May 2, 2008.
Written Opinion from PCT/US2007/061447, mailed May 2, 2008, 4 pages.
Examiner's First Report on Patent Application No. 2007265387, Mar. 9, 2010, 3 pages.
Office Action from U.S. Appl. No. 11/426,556, mailed Apr. 1, 2011, pp. 1-32.

* cited by examiner

CERTIFICATION OF SERVER-SIDE PARTNER PLUG-INS FOR ANALYTICS AND PRIVACY PROTECTION

RELATED APPLICATIONS

This application is a continuation-in-part of, claims priority to, and incorporates by reference, U.S. patent application Ser. No. 11/426,556 filed Jun. 26, 2006. This application also claims the benefit of, and incorporates, U.S. Provisional Patent Application Ser. No. 60/862,516 filed Oct. 23, 2006.

BACKGROUND

Web site usage via browsers is regularly tracked and analyzed by commercially available web analytics services, which gather detailed data about web page usage, and to some extent about particular web site users. Entities which provide other entities with web analytics services are referred to as "analytics providers". One leading web analytics provider is Omniture, Inc., of Orem, Utah, the owner of the present invention. Omniture provides web analytics technology under its well-known mark SiteCatalyst™. All other marks used herein are property of their respective owners.

At present web analytics data are typically collected from server logs or using web beacons. Web-beacons are small image requests placed in a web page to cause communication between the user's device and a server. The server may be controlled by the analytics provider, by the vendor whose website contains the web-beacons, or by another party. Web-beacons are also known as clear GIFs, web bugs, image requests, or pixel tags. Web-beacons can be used for advertising, behavioral targeting, and other processes, to gather information a visits to websites. Web-beacons are commonly used by analytics providers to gather analytics data.

In particular, in some known web-beacon-based analytics systems, a web-beacon was pasted into website pages to cause communication with a core JavaScript file on the customer server; web-beacons may also be hosted on other servers, such as analytics provider (Omniture) servers. The pasted web-beacon code was served on each HTML page the customer wished to track. The core JavaScript file was effectively included via the pasted code, allowing the customer to make some updates to the analytics data gathering process without having to re-tag the entire website.

In one simple and commonly found configuration, the entities involved with analytics are (a) the website visitor, (b) the vendor or other entity responsible for the website being visited by the user, and (c) the analytics provider that was retained by the vendor to obtain analytics data about visits to the website. More recent configurations have also involved (d) third-party advertisers or other entities. In some cases, these third party entities have partnered with the analytics provider, and the vendor is their shared customer.

As used herein, "analytics provider" refers to an entity that provides web analytics services, such as Omniture, or Omniture partners or competitors such as Coremetrics, Google, Nedstat, WebSideStory, WebTrends, Epiphany (SSA Global), NetRatings, Sane Solutions (Unica), SAS Institute, aQuantive, DoubleClick, and 24/7 Real Media. "Partner" refers here to an entity which has a formal business relationship with the analytics provider; in the case of analytics provider Omniture, some of the many examples of partners or potential partners are Advertising.com and Baynote. The term 'co-customer' refers to a vendor or other shared customer of the analytics provider and the partner; in the case of analytics provider Omniture, an example of a potential co-customer is AOL.

However, when a partner needed real-time data about website visits via their own web-beacon to provide a desired service to the co-customer, re-tagging has been used. That is, the partner's own web-beacon was pasted into the website pages, in addition to the analytics provider web-beacon. Such re-tagging can require a large investment, which may in turn impede the sales cycle for partners of the analytics provider, and often creates additional expense and delay for the co-customer. As an alternative for partners who don't require their own web-beacon, Omniture and other companies commonly provide bulk data feeds to the partner, which does not require re-tagging. In other words, a partner can collect data regarding co-customer website usage in several ways: collect it directly themselves via their own web-beacon (or by processing server logs), or collect it directly from the co-customer via some sort of data feed, or collect it from a third party (e.g., Omniture or other analytics provider) with the co-customer's permission via a data feed. Of course, another alternative to retagging is to do without the partner's services. Another alternative would be to modify the core JavaScript file in an ad hoc way by adding code inline to the body of that file to gather data requested by the partner, and then sending the resulting data to the partner.

Other concepts related to the present invention may be known, or become apparent through sources other than this background, including without limitation the references being made of record in connection with the present patent application.

SUMMARY

In some embodiments, the present invention provides tools and techniques for facilitating use of analytics plug-ins, namely, web-beacon plug-ins and server-side partner plug-ins. Some methods of the invention may be used by an analytics provider, with steps such as obtaining an analytics plug-in, by writing it or by receiving it from a partner of the analytics provider (or by writing it themselves); scrutinizing the analytics plug-in to determine the extent to which the analytics plug-in complies with certification criteria, such as privacy requirements or requirements for interfacing with a core analytics component of the analytics provider in a web-beacon-based analytics system; certifying the analytics plug-in as compliant with certification criteria; and permitting execution of the analytics plug-in in the web-beacon-based analytics system. Similar methods may be used by parties other than analytics providers. Some embodiments deal solely with web-beacon plug-ins, and some deal only with server-side partner plug-ins.

Some generally corresponding methods may be used by an analytics provider's partner, by a vendor/co-customer, or by another entity's partner, with steps such as creating an analytics plug-in, sending the analytics plug-in to the party for scrutiny, learning the extent to which the scrutinized analytics plug-in complies with the certification criteria, and modifying the analytics plug-in to bring it into compliance if necessary.

The invention also provides systems employing web-beacons and plug-ins, such as a web-beacon-based analytics system including web-beacon code to be pasted into web pages of a co-customer website, core code invoked through the web-beacon code, and partner web-beacon plug-in code invoked through the same web-beacon code. The web-beacon plug-in is configured to plug into the core code to receive control and data from the core code through the interface and to send control and data only in conformance with the interface. The interface is for passing control and data to the plug-in and for limiting the effect of the plug-in on the core code outside the plug-in, e.g., by preventing the plug-in from damaging data used by the core code. Similar systems may employ web-beacons for purposes other than facilitating analytics provider data sharing with partners; some systems employ server-side partner plug-ins.

More generally, the invention provides an infrastructure and analytics plug-in interface which scales to allow multiple such plug-ins. Analytics plug-ins can be written by disparate sources, e.g., by partners, or outsourced by partners to analytics providers or third parties (including the provider) to write on behalf of the partner. Analytics plug-ins can be written to accomplish a variety of business purposes (subject to appropriate privacy protections), facilitating technical actions that include firing a web beacon, writing text to a page, updating a partner's server pursuant to agreements between website providers, visitors, and third party partners, and many others. Using the invention, analytics plug-ins can perform such actions, triggered by various events such as a page load, link click, and so on. Certification parameters are provided, so that co-customers and partners alike can be assured of a specified level of quality, and website visitors can be assured that their privacy protection instructions are followed. In particular, piggybacking off of a deployed web-beacon helps authorized partners collect the data they need, either directly from their own web-beacon deployed on the co-customer web site, or by way of the analytics provider if that is consistent with the website's privacy policy. Plug-in usage tracking and accounting may help make embodiments more attractive and applicable to real-world businesses.

These examples are merely illustrative. The present invention is defined by the claims, and even though this summary helps provide a basis for claims, to the extent this summary conflicts with the claims ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

DETAILED DESCRIPTION

Introduction

The present invention provides tools and techniques to help gather information about user interaction with websites, in a manner that respects website visitor privacy, and also protects and complements analytics provider services and other infrastructure previously put in place. The invention is illustrated in discussions herein and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples. Likewise, analytics providers and their partners and co-customers are often cited in examples herein, but the inventive methods and systems can also be used by others entities.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to be their own lexicographers, with respect to both coined terms and other terms.

It is not necessary for every inventive embodiment or configuration to include every component shown in the figures or discussed in the text, or to include components in the same numbers and relationships shown here. The figures and textual descriptions are merely examples.

A "page event" means a page load, page refresh, or other event modifying web page data in a visitor's device. "Visitor action event" means a click, scroll, resize, other action taken by a visitor to a website. "Programmatic event" means a senddate( ) call, a programmed determination that a specified amount of time has passed, or any other programmatic action.

Methods for use by or on behalf of an analytics provider vary. By way of introduction, one general view is that analytics data gathering and usage proceeds as follows:

(a) An analytics customer sends website usage-related data to a data engine, such as an Omniture data engine. This may be done via web beacon, XML request, or other means.
(b) Next, the data engine handles the data, that is, the data engine processes the data in various ways (organizing it, transmitting copies of it, deriving trends from it, and so on), and stores the data.
(c) Finally, the customer then views reports generated by the analytics provider (or other tools if raw data is provided to the customer), in order to understand the data and its business implications.

The present document discusses web beacon plug-ins, and in particular proposes that a certified piece of code could be allowed to run within the web beacon method of data transmission (step a), which certified code could send data to a partner's data engine. This data sent to the partner is likely a subset of what the customer is sending to the analytics provider, but could also be entirely different data. The present document also discusses server-side partner plug-ins, and in particular proposes that during the handling of the data (step b), an analytics provider could execute certified code to send data to a partner engine on a customer's behalf. Due respect should be paid to privacy concerns, regardless of whether server-side plug-ins or other data transmission tools are implemented with cookies or other technological structures.

Some embodiments proceed as follows. A shopper requests a web page from a website server. As that web page is loaded in the shopper's browser, the browser runs the analytics provider's pasted-in web beacon code. The pasted-in code may request the inclusion of a JS file, which could be hosted on the same server as the web page or a different server. The web beacon code sets variables requested by the customer and makes a request to retrieve a 1×1 transparent image from some server, passing analytics data to that server along with the image request. The data transmitted via that image request will ultimately be processed by the analytics provider. The image request may be sent directly to the analytics provider data collection engine; alternately, the image request may be sent to a server owned by party approved by the analytics provider, and subsequently transmitted from that server to analytics provider's data engine. The customer may have also configured the code such that a web beacon plug-in may execute, sending a separate image request/web beacon directly from the browser to a partner's chosen server. The customer may choose to have the plug-in send a web request or something other than an image request to a partner's chosen server; an image request is simply used as an example. The server(s) receiving the image request(s) record the data values passed in with the image request, and send back a 1×1 transparent image (or whatever was requested) to the shopper's browser. The analytics provider data engine processes and stores the data such that interfaces (Omniture's SiteCatalyst tool, for example) can display the data in reports for the customer to view. Any actions performed by the partners upon reception of data can be separate from the analytics provider and done according to the direct partner-customer relationship.

Analytics Provider Methods, Plug-Ins, Interfaces, Certification, and More

Figure 1:
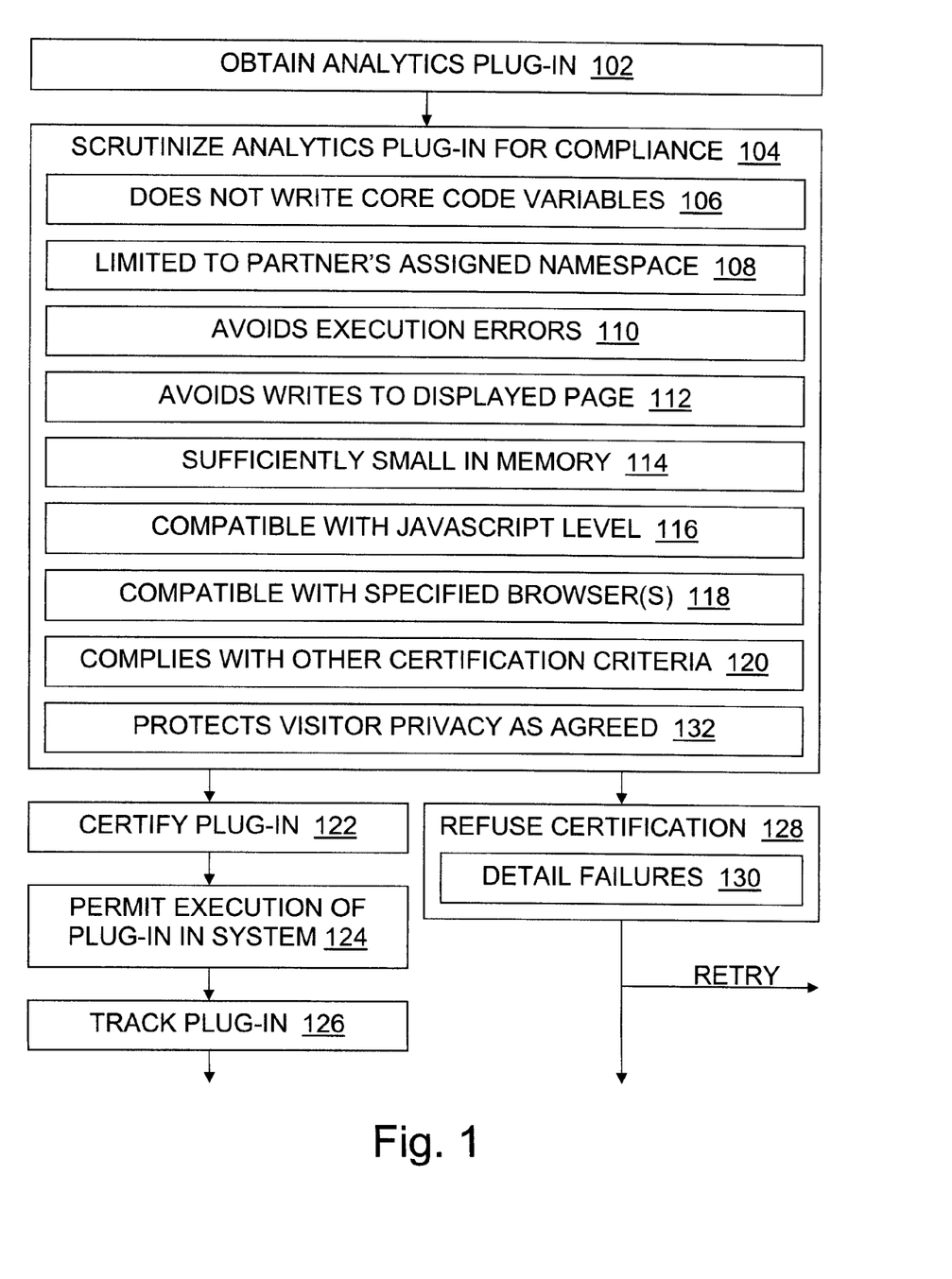
FIG. 1 is a flow chart illustrating methods performed by or on behalf of an analytics provider or other entity to capture, direct, protect, and/or otherwise control the flow of analytics information and facilitate analytics plug-in use, according to at least one embodiment of the present invention.
Figure 2:
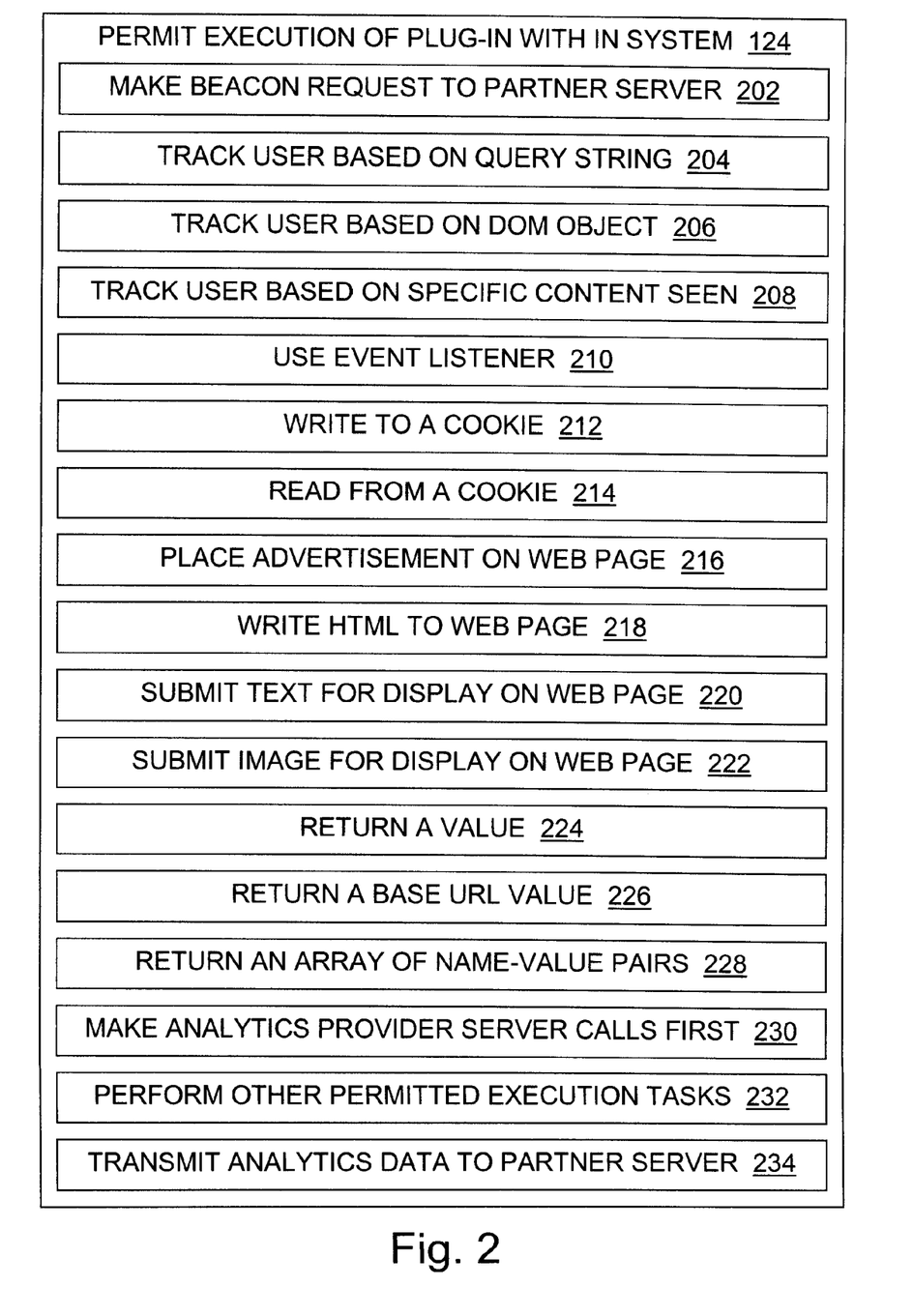
FIG. 2 is a flow chart further illustrating the methods of FIG. 1.

FIGS. 1 and 2 illustrate methods for use by or on behalf of an analytics provider, for instance. Although these inventive methods may be performed by an analytics provider, they may also be performed by another entity, including without limitation by an entity which acts under the direction of, and/or for the benefit of, an analytics provider. Indeed, they may be performed by a partner of the analytics provider, for the mutual benefit of the partner and the analytics provider. Reference is also made to additional figures below, because an understanding of the inventive systems and devices will help an understanding of the methods, and vice versa. The initial focus is on web-beacon plug-ins, but those of skill will appreciate that many aspects of this discussion also apply to other analytics plug-ins, including server-side partner plug-ins.

Figure 4:
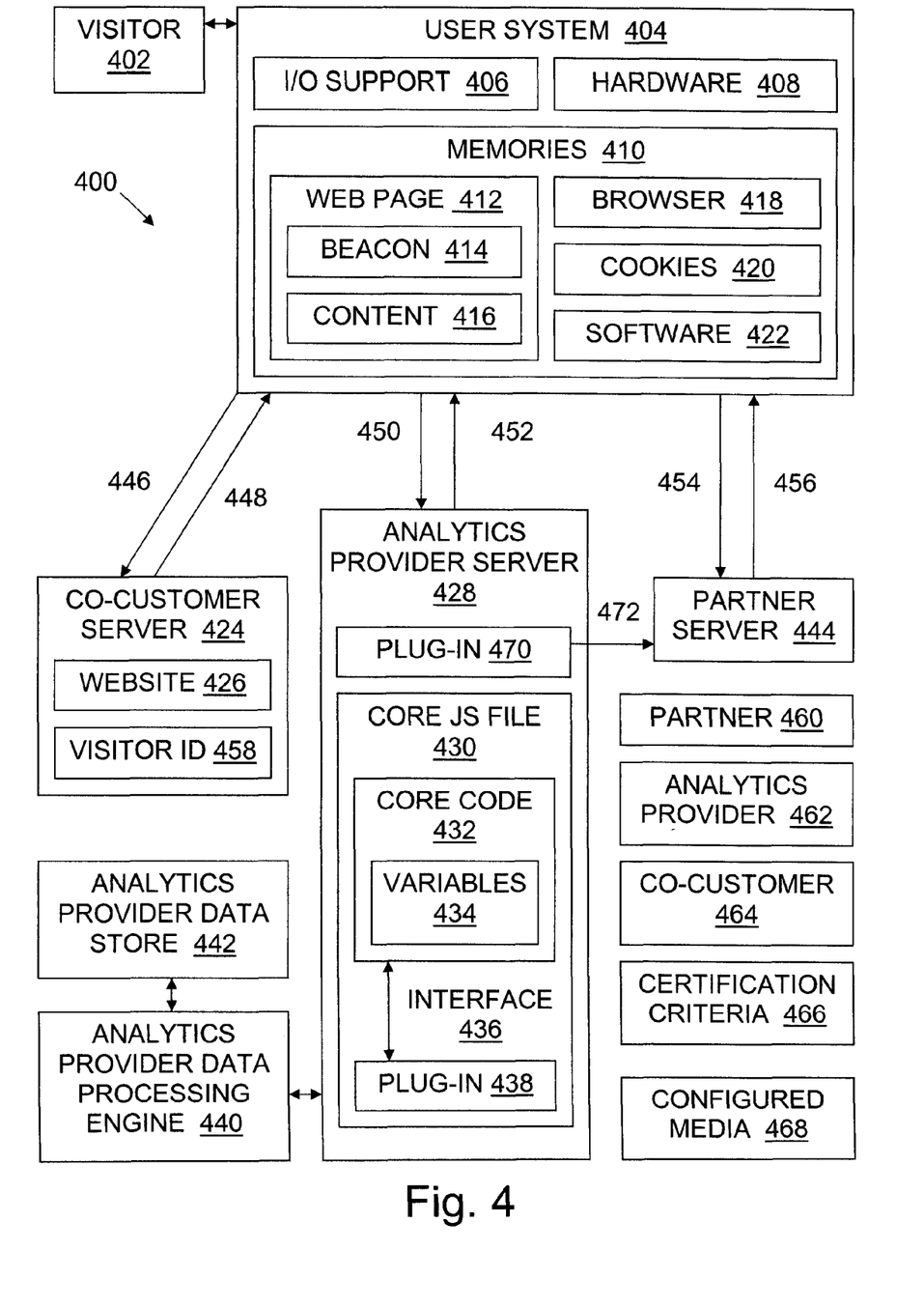
FIG. 4 is a block diagram illustrating roles, data, information and control flow, devices, methods, plug-ins, and other aspects of some system embodiments of the present invention.

During an obtaining step 102, the performing entity receives, creates, or otherwise obtains a web-beacon plug-in 438 or a server-side partner plug-in 470. In particular, the analytics plug-in 438, 470 may be written by an analytics provider, or it may be obtained by an analytics provider from a partner 460 of the analytics provider 462. "Analytics" is used somewhat broadly herein; analytics technology generates and/or gathers data about visitor behavior in websites, including in some cases web page visits, Flash or other multimedia presentation interactions, RSS or other feed interactions, and/or other visitor behavior during networked presentations, in a manner similar to widely used HTML web page analytics.

The obtained analytics plug-in may have been carried by any familiar or hereafter developed transmission conduit, such as email, file transfer, fax, post, courier, screen display, and so on. A party that generates the plug-in also thereby obtains it. Also, an analytics provider can obtain a plug-in from a partner even if the plug-in does not leave the physical presence of the partner; the plug-in may be viewed, copied, or otherwise obtained by an authorized agent or employee of the analytics provider who visits the partner's office, for example. Upon being obtained 102, the plug-in 438, 470 is available for scrutiny 104.

Figure 3:
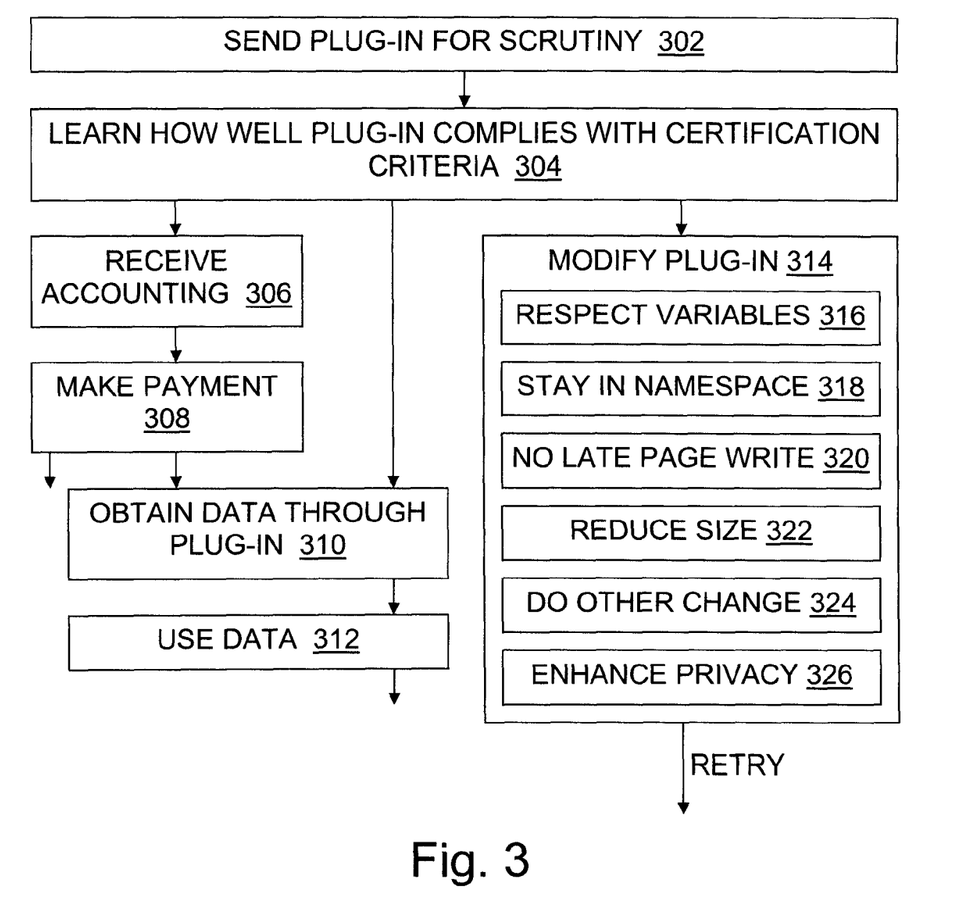
FIG. 3 is a flow chart illustrating methods performed by or on behalf of a partner of an analytics provider to facilitate analytics plug-in use, according to at least one embodiment of the present invention.

During scrutiny 104, the analytics plug-in is scrutinized to determine the extent to which the plug-in 438, 470 complies with certification criteria 466. Some criteria 466 apply only to web-beacon plug-ins, such as not writing to a displayed web page, while other criteria may apply only to server-side partner plug-ins. Some certification criteria may apply to both types of plug-in 438, 470. Scrutiny typically involves at least a review of the plug-in's code (instructions and/or data; source and/or executable). Related information such as screen shots, testbed results, code review summaries, programmer identifications, privacy agreements, and the like, may be considered together with analytics plug-in code. In some cases, such as where the partner 460 submitting 302 the plug-in has already established a strong history of providing compliant plug-in code, the related information may be a sufficiently complete and credible proxy for the code to make analytics provider review of the code itself less detailed or unnecessary.

Regardless, the method includes scrutinizing 104 the analytics plug-in to determine the extent to which the analytics plug-in complies with at least one predetermined certification criterion 466, e.g., a criterion for interfacing 436 with a core analytics component 432 of the analytics provider in a web-beacon-based analytics system 400. Examples of certification criteria 466 are given below, but it may be helpful to note here that certification may be directed, for instance, at requiring specific measures to protect website visitor privacy, or specific measures to prevent the plug-in from interfering with the analytics services that are being provided to the co-customer 464 by the analytics provider 462.

The scrutiny may be concerned at least in part with the interface 436 between the web-beacon plug-in 438 and the analytics provider's core analytics component 432. That interface may be embodied, at least in part, in one or more function calls, as found in an application program interface (API), function specification, DLL interface, library function interface, or the like. However, certification may go beyond the questions of which parameters are passed in a function and what values (if any) are returned from a plug-in function. The effects on the plug-in 438 on global variables 434, memory resources 410, 428, web page 412 text, images, and other content 416 as perceived by the visitor 402, web-beacons 414 in the current web page and other web pages, browsers and/or feed aggregators, etc. 418, cookies 420, and on other system 400 components, may also be important enough to require certification before placing the plug-in in a working system 400. These effects may be part of a defined interface 436, regardless of whether the plug-in is implemented with a function, a macro, the same or a separate thread as the analytics provider code 432, pasted inline code, the same or a separate file as the analytics provider code 432, or in some other manner.

The term "plug-in" is used herein in a manner that differs from at least some usages in the industry. For instance, unlike some known "browser plug-ins", the present plug-in 438 generally would not necessarily add functionality to a browser 418 to enhance the user's sound, video, or animation experience. In some embodiments, web-beacon plug-ins could deliver advertisements, change the appearance of the web page, or otherwise modify the user's experience. The present plug-in 438 plugs most directly into a core JS file 430 or the like, so it 438 would not necessarily be viewed as a plug-in to a web browser, even when it is invoked via a web-beacon 414 of a web page 412 in the web browser 418. "JS" stands for JavaScript. Unlike conventional browser 418 plug-ins, the present plug-in is typically stored and maintained remotely from the visitor's system 404, on a server 428 of the analytics provider 462 and/or a co-customer server 424. The present plug-in 438 need not have a traditional modular form, although that would be a suitable design choice in some embodiments. The server-side partner plug-ins 470 also differ from conventional browser plug-ins in that server-side plug-ins run on a server, not on a website visitor's machine.

In some embodiments, the plug-in 438 is scrutinized 106 to determine whether it avoids changes to values of variables 434 of the core analytics code 432. Such avoidance is a possible certification criterion 466, and the scrutinizing step 104 can be directed at least in part to determining whether the web-beacon plug-in 438 complies with this criterion. Compliance may be required by the analytics provider 462 or a co-customer before they agree to deploy the plug-in in a given system 400, particularly if the system 400 is up and running and the co-customer 464 (and possibly other partners) depend on the availability and accuracy of the data being provided by the system. Plug-in deployment may well be controlled by the party that hosts the core component 430, whether that is an analytics provider, a co-customer, or some other entity.

In some embodiments, the plug-in 438, 470 is scrutinized 108 to determine whether it limits its function names and variable names to a partner-specific namespace. Such a namespace may be assigned to the partner 460 by the analytics provider 462, or assigned in some other manner that prevents name clashes between analytics provider variables 434 and plug-in variables. For example, one possible approach is for the analytics provider to assign a different plug-in prefix <partner prefix> to each of its partners 460. The prefix must then be used in all of that partner's plug-in function and variable names. The analytics provider tag will only cause execution of the partner web-beacon plug-in that is named <partner prefix> main( ). Such naming is a possible certification criterion 466, and a namespace scrutinizing step 108 may determine whether the analytics plug-in 438, 470 complies with this criterion. The certification criteria 466 may collectively define at least a portion of the interface 436; an actual function call such as foo_main( ) may also be part of the interface.

Similarly, in some embodiments one or more of the following are certification criteria 466: avoiding analytics plug-in 438, 470 execution errors (scrutiny step 110); avoiding web-beacon plug-in 438 writes of HTML code to a web page 412 after the web page has been loaded into a display memory 410 of a user's device 404 (scrutiny step 112); keeping the combined size of the web-beacon plug-in 438 and the core analytics component 430 below a predetermined maximum combination size (scrutiny step 114); making the plug-in 438 compatible with a specified JavaScript/ActionScript/VBScript/XML or other code 432 level (scrutiny step 116) and/or with a specified set of web browsers such as the set containing Internet Explorer version X and Firefox version Y, or the set containing all browsers except Netscape 2.0, for instance (scrutiny step 118).

Scrutiny 120 may also examine compliance with other certification criteria. For instance, instead of or in addition to JavaScript, the core component 430 or server-side data engine may use compiled code and/or other software languages or formats; analytics plug-in 438, 470 compatibility with those may be a certification criterion 466. As another example, the plug-in 438, 470 may be required 120 to avoid some or all of the following: network activity, operating system calls, file system calls. The plug-in 438, 470 may also be required 120 to perform certain actions, such as logging its activities, calling debug or trace functions, and the like. To protect 132 visitor 402 privacy, server-side partner plug-ins 470 may be limited in which partner server 444 they send 472 data to, which data values are sent 472, which transmission protocols (e.g., HTTPS) are used, and so on.

In some cases, a scrutinized plug-in 438, 470 will fail some or all of the required criteria. As a result, the analytics provider will normally refuse 128 to certify the plug-in. To help the partner and/or the analytics provider modify 314 the plug-in to make it compliant, the analytics provider will normally also provide 130 details explaining which criteria were not met. Technical suggestions for changes, information about any testbed that was used 104 by the analytics provider, listing of source code 432, 430, 414 with which the plug-in 438, 470 was tested, examples of compliant plug-in code, and/or other detailed information may also be provided 130 to assist the partner.

In other cases, however, the scrutinized plug-in 438, 470 will meet the required criteria 466, perhaps entirely, or perhaps only well enough to proceed to additional testing. Regardless, the analytics provider or another authorized entity will certify 122 the plug-in for use in a system 400, which may be a testbed system or a fully released in-use commercial system, depending on the circumstances. Certification may be outsourced. Certification may be an express action 122 as simple as sending an email accepting the plug-in, or it may be more complex, such as sending the partner a legal agreement to review and enter to assign liability if the certified plug-in does not perform as expected. Certification may also be an implicit action 122, such as running 124 the plug-in in the selected system 400, offering or endorsing the plug-in within the provider's product line or marketing materials, or allowing an installed plug-in 438, 470 to continue running 124.

In short, some methods include the steps of certifying 122 the analytics plug-in as compliant with a plurality of predetermined certification criteria 466, and permitting 124 execution of the analytics plug-in, e.g., in conjunction with execution of the analytics provider data engine and/or core analytics component 430 in the web-beacon-based analytics system 400. Running a scrutinized plug-in in the system 400 performs both steps 122, 124. Certification may also be done separately, e.g., by email, phone, fax, or other communication to the effect of "the plug-in meets the requirements". Permitting 124 execution may be done by actually executing the plug-in 438, 470, or it 124 may be accomplished by simply making it possible for the plug-in to run with little or no additional effort by the parties.

In some embodiments, the permitted execution 124 has an execution order, in which plug-in 438 execution is controlled relative to core code 432 execution. For instance, the core analytics component 430 and its plug-in 438 may be configured 230 such that analytics provider server 428 calls precede partner server 444 calls. In some embodiments, execution of a server-side partner plug-in 470 precedes execution of analytics provider server calls by the data engine. If multiple plug-ins are present, they will normally execute in some sequence rather than completely in parallel, at least under current execution technologies, but they should not normally assume any particular execution order amongst themselves. In an alternate embodiment, plug-ins belong to execution classes, and those in one class have higher execution priority than those in another class.

In general, the analytics provider will track 126 plug-in 438, 470 execution, using log files, profilers, counters, and/or other familiar tools for tracking software execution. Tracking will assist in debugging and optimization, and may also be used as a basis for an accounting sent 306 to the partner 460. The analytics provider may track 126 the number of executions of the web-beacon plug-in in conjunction with execution of the core analytics component in the web-beacon-based analytics system, and/or the number of web pages from which execution of the web-beacon plug-in was invoked, for example.

In some embodiments, the web-beacon plug-in code includes a permitted execution means for providing analytics information flow control. This means includes computer source, object, or other code for performing 124 one or more of the following actions: making a web-beacon request to a server of the partner 202; tracking website user behavior based on a query string 204; tracking website user behavior based on interaction with a DOM object 206; tracking website user behavior based on viewing of specific website content 208; using an event listener 210; writing data to a cookie 212; reading data from a cookie 214; placing an advertisement in a web page for display to a website user 216; writing HTML to a web page 218; submitting text to be displayed in a web page 220; submitting an image to be displayed in a web page 222; returning a value 224; returning a base URL value 226; returning an array of name-value pairs 228.

These items are not mutually exclusive; more than one may be present in the code means in question. Indeed, these items overlap in some cases, e.g., returning a base URL value 226 is a particular way to return a value 224. In particular, the partner web-beacon plug-in code 438 can be configured in some embodiments as a function which returns a base URL and an array of name-value pairs. Other permitted execution tasks 232 of analytics plug-ins 438, 470, which are not necessarily part of the particular means for providing analytics information flow control just described, include defining variables, emitting debugger statements, reading global variables, and other actions of the type normally performed in analytics software generally.

Partner Methods

FIG. 3 illustrates methods for use by a partner of an analytics provider; they may also be performed by one department of an analytics provider for scrutiny by another department, for example. These methods correspond generally to the methods illustrated in FIGS. 1 and 2. For instance, a step 302 of sending an analytics plug-in 438, 470 for scrutiny corresponds to obtaining 102 the plug-in. The same or similar transmission media used to obtain 102 the plug-in 438, 470 may also be used to send 302 the plug-in. The scrutiny itself may be performed 104 by the partner, before being performed 104 by the analytics provider, or in consultation with the analytics provider. Similarly, the steps of detailing 130 the scrutiny results and/or certifying 122 the plug-in correspond to a step of learning 304 how well the plug-in 438, 470 complies with the certification criteria 466.

If the plug-in is certified 122 and permitted 124 to execute, then the tracking 126 supports production 306 of an accounting, as discussed above. Some business arrangements may require that the partner 460 pay 308 the analytics provider for permitting execution of the partner's plug-in. Payment may be based on the number of pages 412 that invoke the plug-in 438, the number of times the plug-in 438, 470 executes, or on some other basis, such as a flat fee. In general, the partner wants the plug-in to run so that the partner can obtain 310 analytics data via the plug-in, which data the partner will then use 312 in providing services to the co-customer 464. For instance, the partner may use 312 the data to place 216 targeted ads within web pages 412.

If the plug-in is refused 128 certification, the partner (or someone acting on its behalf) may modify 314 the plug-in 438, 470 in an attempt to make it comply with the certification criteria 466. For example, the partner may remove 316 plug-in code that overrides or changes analytics code tag variables 434; may change 318 variable and function names to stay within the assigned namespace; may remove 320 code that changes the text, images, sounds, or other content 416 displayed to the visitor 402; may remove variables and/or otherwise optimize code to make 322 it smaller; limit data sent, encrypt data, authenticate the receiving server, or otherwise enhance 326 the privacy of visitors when transmitting 234 analytics data to a partner; and/or may make 324 other changes to satisfy the certification criteria 466. Modified code can be submitted 302 to the analytics provider or other scrutinizer, scrutinized 104, and acted on 122, 124, 126, 128, 130 as previously discussed.

Systems, Operation, and More

FIG. 4 illustrates a web-beacon-based system 400. The visitor 402 is typically an individual person; the co-customer 464, analytics provider 464 and partner 460 will typically be corporations, agencies, institutions, or other business entities.

The visitor's system 404 will often be a computer with corresponding I/O support 406 (keyboard, mouse, screen, speakers, trackball, touch screen, stylus, microphone, network link, etc.) and other software 422 (operating system, file system, diagnostics, applications) and hardware 408 (processor, local disk, etc.). But the visitor system 404 may include other devices capable of receiving a web page 412, such as cell phones, mobile phones, wireless devices such as those sold under the Blackberry mark, personal digital assistants such as those sold under the Palm mark, and/or other devices, including handheld devices and others, which support visitor 402 actions to be tracked. Even if the device is a computer 404, it may be part of a client-server network or it may be a peer in a peer-to-peer network, or it may be a node in some other type of network.

Some embodiments include a computer-readable storage medium 468 such as a flash memory, CD, DVD, removable drive, or the like, which is configured to work in conjunction with a processor to perform a process for web-beacon certification and/or use as discussed herein. A hard disk, RAM, tape, or other memory 410 in a visitor device 404 and/or a server 428 may also be configured to serve as a computer-readable storage medium 468 embodying the invention. It will be understood that method embodiments and configured media embodiments are generally closely related, in the sense that many methods can be implemented using code that configures a medium, and that many configured media are configured by code which performs a method. Those of skill will understand that legally equivalent methods may also be performed using hardwired special-purpose hardware which does not contain a ROM, PROM, EEPROM, RAM, or other memory medium embodying code that performs a method, but such implementations are expected to be unusual because of the generally high cost of implementing methods completely in silicon without a medium containing microcode or other code.

The illustrated web-beacon-based analytics system 400 includes web-beacon code 414 pasted into web pages 412 of a co-customer website 426; core analytics code 432 invoked through the web-beacon code, the core analytics code having an interface 436 for passing control and data to the plug-in 438 and for limiting the effect of the plug-in on the core analytics code outside the plug-in to protect the availability and accuracy of analytics data; partner web-beacon plug-in code 438 which is configured to plug into the core analytics code 432 to receive control and data from the core analytics code through the interface and to send control and data only in conformance with the interface 436, and partner server-side plug-in code 470 which is configured to plug into the analytics provider data engine to process analytics data sent there using web beacons, XML, or other means. In some embodiments, the partner web-beacon plug-in 438 code consists essentially of a JavaScript function; that is, the plug-in may include more than a JavaScript function, but it will not function as desired without some JavaScript function that is thus essential to it. In some cases, a web-beacon plug-in may be allowed by the interface to change the value of a variable that is defined outside the web-beacon plug-in; in other cases, no such changes are allowed. Those of skill in the programming arts, and in particular in the use of global variables, modularity, and similar programming concepts, will appreciate when an implementation would benefit by each respective approach.

In some embodiments, at least one analytics variable 434 is defined and written by the core analytics code 432, is read by the partner web-beacon plug-in code 438, and is not written by the partner web-beacon plug-in code 438. Meeting these conditions may be a way of satisfying 316 a certification criterion 466.

In some embodiments, the system 400 is configured to send 450 an image request to a server 428 of the analytics provider, to receive 452 a response, and to then send 454 a different image request to a server 444 of the partner. Adhering to this sequence 230 may be a way of satisfying 120 a certification criterion 466.

In some embodiments, the system 400 is configured to invoke the partner web-beacon plug-in code 438 in response to one or more of the following events: page 412 load, user 402 click, senddate( ) call. A given system 400 may also be configured to invoke the partner web-beacon plug-in code 438 in response to other events.

In some embodiments, the system 400 is configured with unique visitor IDs 458 which are generated by a co-customer server 424 and/or by co-customer code 422 on the visitor's device 404. These visitor IDs 458 are used by the core analytics code or other parts of the data engine 423, and are also used 232, 234 by the partner web-beacon plug-in code 438 and/or the server-side partner plug-in code 470. Adhering 120 to specified types and/or uses of visitor IDs may be a certification criterion 466.

In some embodiments, the system 400 is configured to be free of any data exchange between analytics provider web-beacons 414 and partner web-beacons. Thus, any analytics data obtained 310 by the partner 460 comes by way of the partner's plug-in 438, 470. Avoiding 120 data exchange between analytics provider web-beacons 414 and partner web-beacons may be a certification criterion 466.

Some embodiments include a plug-in 438, 470 produced by a method described herein. Some include analytics data structures produced and/or updated by the inventive methods. Such plug-ins and structures may be stored in—and thus configure—any computer-readable medium, including removable media 468 or memories 410. They may be implemented in JavaScript, ActionScript, VBScript, C++, Java, XML, Perl, and/or another programming or scripting language, or in a combination of languages, except as otherwise required by operability or claim limitations.

In operation, some embodiments proceed as follows. The visitor enters an URL, clicks on a hyperlink, or otherwise selects the co-customer's website 426 to visit, or if already at the website, selects a page of the site to visit. This leads to a request 446 from the co-customer's server 424, which in turn produces a web page 412 that is sent 448 over a network connection 406 to the user's device 404, and to the user's browser 418 in particular. Assume that web page 412 was tagged with a web-beacon 414 to support analytics services being provided to the co-customer 464 by the analytics provider 462.

The browser directs 450 a request—which may include raw analytics data—to the analytics provider's server. In Omniture terms, a hit comes to the data collection engine containing SiteCatalyst information, e.g., along request 450 may be something along the lines of "1×1.gif?campaign=1234567& . . . ". The analytics provider server 428 responds 452 with the clear GIF; in Omniture terms, the data collection engine returns a GIF. It will be appreciated that Omniture's data collection engine is merely an example of the more general case, namely, a network entity. In some embodiments, the browser 418 executes the JS file 430 and therefore executes the JS plug-in 438. In some embodiments, the analytics provider servers 428 may execute a plug-in 470 written for that platform, e.g., to send 234, 472 data to a partner server 444. In the illustrated system 400, analytics data also flows from the analytics provider server 428 to an analytics provider data processing engine 440 and an analytics provider data store 442, which are known in the art.

Stated differently, in Omniture terms, a web-beacon request comes to the data collection server containing web site usage information, e.g., request 450 may be something along the lines of "[address]?c=123456& . . . ". The analytics provider server 428 responds 452 with a GIF; in Omniture terms, the data collection server returns a transparent GIF.

The partner plug-in 438 generates a separate image request 454 to the partner server 444. For instance, this partner image request could be along the lines of "partner.com/track. gif? customer _ id = 123456789&campaign=1234567 & . . . ". The partner server thus leverages 310 analytics data for the partner to use 312. All applicable laws, policies, agreements, and practices as to privacy and data sharing should, of course, be respected. The partner server returns 456 a clear GIF, and the visitor's browsing experience continues.

Additional Examples

In some embodiments, some or all of the following characteristics are present in a system 400 and/or used in a method according to the present invention. These are merely examples, and are thus not necessarily required in a given embodiment, regardless of whether terms like "should" or "will" are used in describing them:

The plug-in 438 is a JavaScript function.
The plug-in 438 is JavaScript 1.0 compatible.
The plug-in 438, 470 is backwards compatible.
The JavaScript file 430 and plug-in 438 run only inside a web browser 418.
The JavaScript file 430 is served 448 by a co-customer's server 424.
The partner must manage its own web-beacon 414 and its own cookies 420. This solution does not include data exchange between web-beacons, or redirects/pass thrus. Technical and process requirements will be imposed on the plug-ins 438, 470 in order to protect the analytics provider's own web-beacon and service.
The analytics provider tag always executes any analytics provider server 428 calls first. Any partner server 444 calls will be executed after the analytics provider server 428 call(s). The partner web-beacon plug-in 438 will be executed prior to the analytics provider server call, so that the analytics provider server call can track 126 partner plug-in usage, but the actual partner image request 454 will not be sent until after the analytics provider server 428 call(s).

Following is a first run at the expected order of execution for Omniture H code:
1. Include our JS file
2. Write image/JavaScript placeholders if necessary
3. Set Omniture variables
4. Run partner functions/plug-ins
5. Fire Omniture gif
6. Fire partner gifs—at anytime after the page loads
7. Record billing info in a cookie or otherwise for later submission To protect the namespace, the analytics provider assigns a plug-in prefix (<partner prefix>) or other identifier to each certified partner. This prefix or identifier must be used in all function and variable names. The analytics provider tag may only execute the partner plug-in 438, 470 that follows a specified naming convention, such as plug-ins 438, 470 named "<partner prefix>_main".

The plug-in 438 has access to all analytics provider tag object variables but it may not override or change the value of those variables. The plug-in 438, 470 may introduce new variables within the plug-in; all such variables must use the assigned plug-in partner prefix.

Under a web-beacon plug-in approach, partners who wish to leverage the analytics provider's image tag management code (checking browser versions, writing out objects vs. tags, etc.) can write a simple plug-in 438 to generate and return a base URL and an array of name-value pairs. The analytics provider's code will construct the URL and perform the image handling. Under an ad hoc plug-in approach (which is not necessarily commercially available initially), partners who wish to perform their own image tag management, or who require functionality beyond generating a web-beacon, may write a plug-in 438 that returns no value; the analytics provider will do nothing beyond calling the certified plug-in.

In some instances, partners will want to customize their generic plug-in 438, 470. For example, it is known in the art for targeted advertisers to customize their web-beacons for certain co-customers who want to target segments of their site. Similar customization of a plug-in 438 is possible. If the partner 460 works with the co-customer 464 to customize plug-in code 438, 470 after that code has been generated and/or otherwise certified by the analytics provider 462, they would do so at the co-customer's own risk. The co-customer may need to manage and retain such custom code, as a given analytics provider's code generation system will not necessarily regenerate such custom code.

It may develop that a key best practice is for co-customers 464 to establish their own visitor IDs 458. This approach would scale, and allow the co-customer to tie diverse data sets together accurately. Accordingly, it may be recommended that the co-customer set their own unique visitor ID in their own first-party cookie 420 and then send 450, 454 that unique visitor ID to the analytics provider and the partner(s) 460.

The invention allows, but does not necessarily require, partners to tag co-customer pages from within the analytics provider's JavaScript file. This allows the JavaScript file, and possibly one or more other files, to create reports to be used for billing the partner. The decision whether to allow partner tags, or other data usage by partners, is typically governed by at least the following: applicable privacy laws, the agreement between the co-customer 464 and visitors 402 to the co-customer's website 426, and the agreement between the co-customer 464 and the partner 460. Here, as elsewhere in the present document, the mere fact that an embodiment is possible does not mean that the embodiment must be actually implemented. Patents provide a right to prevent actions, as well as to perform them exclusively.

The partner web-beacon plug-ins 438 can deploy JavaScript on all pages, to: include an image beacon on all or specific pages; track user behavior based on query string parameters 204, DOM interaction 206, viewing specific content 208, etc.; store 212 user behavior in cookies; include 216 advertisements on all or specific pages; and/or perform 232 other permitted execution means for providing analytics information flow control.

The JavaScript plug-in interface 436 includes an API with functions that allow partners 460 to attach event listeners 210, reference DOM objects 206, write 212 and read 214 cookies 420, and submit 220 some text to be written to the page by the analytics provider's JS file 430. This text can be any valid HTML, including references to JavaScript files and images.

Partners 460 have the ability to attach 210 event listeners in all browsers 418. Known event listener functionality for old browsers is expanded to support calling any number of event listeners. If this creates potential problems or significantly increases the size of the core JS file 430, it can be dropped, e.g., by only supporting only new browsers.

Clear documentation should be provided, for example, of the JavaScript API, dos and don'ts for plug-in writing, plug-in examples, and limitations. For example, in Omniture terms the browser-specific event listener functions (addEventListener and attachEvent) could be passed the word "click" and the DOM object to attach to; addEventListener could be called with "click" and attachEvent with "onclick." This can done to reduce JS file 430 size. Clear documentation is given about the DOM objects referenced in the analytics provider's code 432. In addition to aiding plug-in development, this could to allow partners 460 to use an analytic provider's very small variable names and thus reduce plug-in size.

Some parties are concerned about the number of cookies written on their domains. It is possible to combine all cookies written by the JavaScript file 430 into a single set of cookies. There are known requirements for implementing this type of cookie, e.g., all JS files on a domain need to use the same logic. The interface API 436 should allow clients to read and write either a combined cookie or their own separate cookie. The combined cookie will keep the total cookie count down, and the separate cookie will allow partners to read and write cookies outside of the analytics provider's JS file. A limit, e.g., 4K bytes, could be imposed if cookies get too large. Limits may be placed on partner cookies to prevent analytics provider cookies from being bumped. Partners that may generate large cookies should be allowed to have cookies in or out of the analytics provider's combined cookies. Part of the guidelines for approving plug-ins should include validation of cookie size, unless there is a programmatic way to limit cookie usage without breaking functionality. As noted above, mere technical capability does not imply or require actual implementation.

An administration module and/or other tools may be provided to help customers generate and otherwise manage plug-ins 438, 470.

Functionality may be provided to let customers update DOM objects on the web page. For instance, this could allow customers to update existing image placeholders or other tags on the page. The most common use might well be updating an image placeholder, but support for updating the HTML within DIV tags or inserting objects into the DOM could also be supported.

The plug-in 438 allows a partner 460 to write HTML code to the page 412. This may be an image beacon, a reference to a JS file, or an HTML table with references inside of it. This should only be allowed as the page loads, to avoid problems with overwriting the page.

In Omniture terms, a doPlugins function is called when the page 412 loads, each time a user 402 clicks on the page and each time the send-date function (t) is called. To avoid problems with overwriting the page after the page loads, any functions that write to the page should only be called as the page loads. Partners should be allowed to create functions that are called as event listeners 210, and those functions should be allowed to update the DOM 206 in a way similar to the way that Omniture or another analytics provider does. Because most partners will be using a beacon system, the system 400 should support the ability to update the source of images already included in the page at any time via a function call.

Steps are taken to prevent JS errors in analytics provider code. For instance, new browsers allow error handling, which should be taken advantage of. Additionally, documentation should be provided so that a solid review 104 process is outlined, instructing the implementation team on how to review a plug-in for potential errors.

In Omniture terms, plug-in support may be limited to newer releases, e.g., only version H code would be supported initially, with a potential for supporting G code later based on business development and partner needs, for example. Web-beacon plug-in support may be limited to certain versions of the web-beacon tag, those versions and that support may be influenced by business decisions, new browsers and technology, etc.

Efforts may be made to shrink the pre-existing core JS file 430. Partners and customers may express concern about the size of JavaScript files on the page 412. Relative page weight and page load speed may be concerns, whether or not there is some upper limit on page size, but these concerns are referred to collectively herein as "size constraints". The smaller the JS file 430 is, the more room there is to add partner plug-ins 438. While using gzip compression on the file 430 will technically work, some clients are reluctant to make changes to their web servers, especially if they're not comfortable with the compression plug-ins like mod-gzip. The JavaScript file 430 to be used should be revisited in an effort to shrink it as much as possible. For example, by writing a function that performs a substring, another that returns the indexOf value on a string, etc, one can shrink the Omniture JS file by about 300 bytes. Devoting some engineering resources to shrinking the file 430 may to increase the likelihood of adoption of some embodiments of the invention. The core JS file may also be altered or enhanced, e.g., to track site sections. Adjustments to the JS file based on size or other considerations may be made to accommodate the plug-in structure. For example, customers or others may express concern regarding the resulting size of the JS file when considering adding partner plug-ins. The plug-in provider may provide optimizations or adjustments to the provided JS file to address these concerns. More generally, the JS file may be adjusted or updated based on size or other considerations to accommodate plug-in(s).

Partner analytics plug-in executions are captured. Because partners are utilizing an analytics provider's code base to implement, they may be charged 308 a per-execution fee, or CPMM (cost per million impressions). Thus, it is helpful or necessary in these embodiments to accurately track the number of plug-in executions, and/or the number of pages on which the partner code is included. For example, the functions that update an image placeholder or write HTML to the page could contain a flag designating that this is a billable action. These image requests may be sent after Omniture's image request. For reporting purposes, the partner billing is not necessarily company specific, but may in some embodiments allow for company specific data. For example, a partner may be able to get a report or other accounting that shows the number of total executions by co-customer (analytics provider client). Report format may depend on whether the report is consumed only within the analytics provider (e.g., Omniture's accounting department) or sent outside. The embodiment may allow partners to receive billing information on a per "data sent" model, or via a per co-customer model. The per co-customer model may be easier to track (account for each co-customer that uses the plug-in), but one may also have the ability to track execution of the web-beacon plug-in to validate. One may log the number of times a partner image request is sent via the web-beacon plug-in. In some implementations, if a cookie is used, this may lose some accuracy due to exit links. The data may be collected globally—across data centers. Co-customers may have many partner plug-ins running on their pages at once, so data for all of these partners may be collected in a standardized manner (e.g., the standard image request or similar).

In some embodiments, a web-beacon plug-in 438 is a separate JavaScript object much like a web analytics tracking object, in order to encapsulate some or all of the plug-in's functionality as well as to interoperate with the web analytics tracking object, other plug-ins, or other JavaScript on a webpage 412. In some embodiments, an instance of a plug-in is unique to the web analytics tracking object with which it was created; they are not shared between instances. One implementation approach is to:

1. Enable the plug-in and set any config parameters for that plug-in;
2. Define the plug-in;
3. A web analytics tracking object will call setup and run for each plug-in when the page-view is tracked;
4. The plug-in's setup method should turn on any event listeners needed;
5. Each click on a page that causes a tracking method to fire will also call the plug-in's run method.

CONCLUSION

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products. Limitations from one embodiment are not necessarily read into another.

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed. Headings herein are provided for convenience only; information on a given topic may often be found outside the section whose heading indicates that topic.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools, including without limitation except as expressly required, JavaScript code, as well as other scripting languages, HTML, XML, APIs, SDK s, network protocol stacks, assembly language, firmware, microcode, compilers, debuggers, and/or other languages and tools.

Although this document includes at least one website address, such addresses and the material on the sites thus addressed are provided only for background and/or as examples to help illustrate the invention. This document does not incorporate by reference any essential material from such websites.

The embodiments discussed are illustrative of the application for the principles of the present invention. Numerous modifications and alternative embodiments can be devised without departing from the spirit and scope of the present invention.

The invention claimed is:

1. A method for use in certifying server-side partner plug-ins, the method comprising:
    performing by one or more computers:
        obtaining, from a partner server, a server-side partner plug-in configured to be executed on an analytics server, wherein the analytics server is configured to gather analytics data regarding network site visitor behavior, and wherein the analytics server is configured to send at least a portion of the analytics data to the partner server upon execution of the server-side partner plug-in;
        scrutinizing the server-side partner plug-in to determine whether the server-side partner plug-in complies with predetermined certification criterion for handling data; and
        upon determining that the server-side partner plug-in does not comply with predetermined certification criterion for handling data, refusing to certify the server-side partner plug-in such that the server-side partner plug-in is not executed on the analytics server.

2. The method of claim 1, wherein at least one predetermined certification criterion comprises the server-side partner plug-in avoiding violation of a stated privacy policy of a co-customer website.

3. The method of claim 1, wherein at least one predetermined certification criterion comprises the destination of data transmitted by the server-side partner plug-in is authorized to receive the data.

4. The method of claim 1, wherein at least one predetermined certification criterion comprises secure transmission of data transmitted by the server-side partner plug-in.

5. The method of claim 1, further comprising the steps of:
    upon determining that the server-side partner plug-in does comply with predetermined certification criteria, certifying the server-side partner plug-in such that the server-side partner plug-in is executable on the analytics server.

6. The method of claim 5, further comprising tracking at least one of: the number of executions of the server-side partner plug-in within the analytics server, the number of web pages from which data was given to the server-side part plug-in.

7. A method for using server-side partner plug-ins, the method comprising:
    sending, to an analytics server, a server-side partner plug-in configured to be executed on an analytics server, wherein the analytics server is configured to gather analytics data regarding website visitor behavior, and wherein the analytics server is configured to send at least a portion of the analytics data to a partner server upon execution of the server-side partner plug-in, and wherein the server-side partner plug-in is scrutinized to determine whether the server-side partner plug-in complies with predetermined certification criterion for handling data; and
    receiving a response indicative of a refusal to certify the server-side partner plug-in, wherein the refusal to certify the server-side partner plug-in is indicative of a refusal to execute the server-side partner plug-in on the analytics server.

8. The method of claim 7, further comprising receiving a response indicative of a certification of the server-side partner plug-in, wherein the certification is indicative of enabling execution of the server-side partner plug-in on the analytics serve.

9. The method of claim 7, further comprising modifying the previously scrutinized server-side partner plug-in to bring it into compliance with at least one certification criterion that it did not previously comply with.

10. The method of claim 8, further comprising receiving an accounting indicating at least one of: the number of executions of the server-side partner plug-in within the analytics data engine, the number of web pages from which data was given to the server-side part plug-in.

11. An analytics system employing at least one server-side partner plug-in, the system comprising an analytics data engine configured to:
    obtain, from a partner server, a server-side partner plug-in configured to be executed on the analytics data engine, wherein the analytics data engine is configured to gather analytics data regarding network site visitor behavior, and wherein the analytics data engine is configured to send at least a portion of the analytics data to the partner server upon execution of the server-side partner plug-in;
    scrutinize the server-side partner plug-in to determine whether the server-side partner plug-in complies with predetermined certification criterion for handling data; and
    upon determining that the server-side partner plug-in does not comply with predetermined certification criterion for handling data, refusing to certify the server-side partner plug-in such that the server-side partner plug-in is not executed on the analytics server; and
    upon determining that the server-side partner plug-in does comply with predetermined certification criterion for handling data;
        certify the server-side partner plug-in such that the server-side partner plug-in is executable on analytics data engine;
        receive server analytics data about a co-customer website; and
        execute server-side partner plug-in code to send at least a portion of the analytics data to the partner server.

12. The system of claim 11, wherein at least one predetermined certification criterion comprises the server-side partner plug-in avoiding violation of a stated privacy policy of a co-customer website.

13. The system of claim 11, wherein at least one predetermined certification criterion comprises the destination of data transmitted by the server-side partner plug-in is authorized to receive the data.

14. The system of claim 11, wherein at least one predetermined certification criterion comprises secure transmission of data transmitted by the server-side partner plug-in.

15. The system of claim 11, wherein the system is configured to provide an accounting indicating at least one of: the number of executions of the server-side partner plug-in within the analytics data engine, the number of web pages from which data was given to the server-side part plug-in.

* * * * *